United States Patent
Kameo et al.

(10) Patent No.: US 8,137,727 B2
(45) Date of Patent: Mar. 20, 2012

(54) BREAD SUITABLE FOR HEATING IN MICROWAVE OVEN

(75) Inventors: Yoji Kameo, Sumida-ku (JP); Tatsuya Tokunaga, Sumida-ku (JP)

(73) Assignee: Kao Corporation, Tokyo (JP)

( * ) Notice: Subject to any disclaimer, the term of this patent is extended or adjusted under 35 U.S.C. 154(b) by 684 days.

(21) Appl. No.: 11/911,070

(22) PCT Filed: Mar. 30, 2006

(86) PCT No.: PCT/JP2006/307282
§ 371 (c)(1),
(2), (4) Date: Apr. 1, 2008

(87) PCT Pub. No.: WO2006/109657
PCT Pub. Date: Oct. 19, 2006

(65) Prior Publication Data
US 2009/0081348 A1 Mar. 26, 2009

(30) Foreign Application Priority Data
Apr. 8, 2005 (JP) .................................. 2005-111548

(51) Int. Cl.
*A21D 13/06* (2006.01)
(52) U.S. Cl. ........ 426/549; 426/241; 426/243; 426/496; 426/601
(58) Field of Classification Search .................. None
See application file for complete search history.

(56) References Cited

U.S. PATENT DOCUMENTS

| | | | | |
|---|---|---|---|---|
| 4,885,180 A | * | 12/1989 | Cochran et al. | 426/241 |
| 6,919,098 B2 | * | 7/2005 | Ratka et al. | 426/128 |
| 2007/0059425 A1 | | 3/2007 | Kameo et al. | |

FOREIGN PATENT DOCUMENTS

| | | |
|---|---|---|
| CA | 2010709 | 8/1990 |
| JP | 63-287435 | 11/1988 |
| JP | 2-222639 | 9/1990 |
| JP | 4-36140 | 2/1992 |
| JP | 5-15298 | 1/1993 |
| JP | 5-68466 | 3/1993 |
| JP | 8-103235 | 4/1996 |
| JP | 11-169061 | 6/1999 |
| JP | 11-262356 | 9/1999 |
| JP | 2002-281915 | 10/2002 |
| JP | 3540313 | 7/2004 |
| JP | 2005/000048 | 1/2005 |
| JP | 2005-176733 | 7/2005 |
| JP | 2005-185165 | 7/2005 |
| JP | 2005-237341 | 9/2005 |
| KR | 20060018242 | 2/2006 |
| WO | 2004/110160 | 12/2004 |

OTHER PUBLICATIONS

Owen R. Fennema, "Food Chemistry", 1996, pp. 203-204.*
U.S. Appl. No. 11/719,896, filed May 22, 2007, Kameo, et al.

* cited by examiner

*Primary Examiner* — Lien Tran
(74) *Attorney, Agent, or Firm* — Oblon, Spivak, McClelland, Maier & Neustadt, L.L.P.

(57) ABSTRACT

Disclosed is bread suited for heating in a microwave oven, containing:

1 to 67 parts by weight of (A) fat and oil, 0.001 to 2 parts by weight of (B) a humectant, and 0.1 to 7 parts by weight of (C) an emulsifier, incorporated into 100 parts by weight of cereal flour containing primarily wheat flour containing crude protein in an amount of 9% by weight or more and less than 11.5% by weight.

8 Claims, No Drawings

BREAD SUITABLE FOR HEATING IN MICROWAVE OVEN

FIELD OF THE INVENTION

The present invention relates to bread, which was stored at room temperature, chilled, or frozen, to be eaten after heating in a microwave oven.

BACKGROUND OF THE INVENTION

The scenario in which baked bread including mostly hot dog and hamburger buns are heated in a microwave oven before serving them to consumers is increasing in recent years in stores such as convenience stores, fast food shops, etc. Eating of purchased bread in a warm state at home after heating in a home microwave oven is also increasing. However, bread after heating in a microwave oven will harden rapidly (become hard to chew and hard to cut) and significantly deteriorate its texture. In recent years, high-power microwave ovens with a power of greater than 1000 W enabling rapid heating are used in convenience stores etc., and the deterioration in texture by heating in such microwave ovens is further accelerated at present.

With the above-mentioned background given, there is demand for easy-to-eat bread excellent in dissolution in the mouth, which suppresses hardening even after heating in a microwave oven, particularly in a high-power microwave oven. In conventional techniques, improvements in texture by compounding with fats and oils or with an emulsifier have been proposed (JP-A 63-287435 and JP-A 2-222639). There are also techniques of using a thickener in bread intended to be heated in microwave ovens; for example, a technique of using an alginate easter (JP-A 2002-281915), a technique of using a starch-pregelatinized product and water-holding dietary fiber (JP-A 4-36140), a technique of using edible fat and oil, an emulsifier and pregelatinized starch (JP-A 11-262356) and a technique of using an emulsifier, fat and oil, and albumen (JP-A 2-222639) have been proposed.

SUMMARY OF THE INVENTION

The present invention provides bread suited for heating in a microwave oven, containing:

1 to 67 parts by weight of (A) fat and oil,
0.001 to 2 parts by weight of (B) a humectant, and
0.1 to 7 parts by weight of (C) an emulsifier, incorporated into 100 parts by weight of cereal flour containing primarily wheat flour containing a crude protein in an amount of 9% by weight or more and less than 11.5% by weight.

DETAILED DESCRIPTION OF THE INVENTION

When the problem of deterioration in the texture of bread by heating in microwave ovens is solved by the technique of compounding with fats and oils or with an emulsifier, they are added in a larger amount than in usual bread. By doing so, the effect of suppressing the deterioration in texture by heating in a microwave range can be achieved to some extent, but there appears the influence of the addition of the excess emulsifier itself sometimes results in the failure to provide the bread with an excellent flavor and texture.

In the techniques of using a thickener, pregelatinized starch etc., the thickener, pregelatinized starch etc. are allowed to act as a water retention agent by which the ability of bread to retain water is improved even upon rapid overheating accompanying heating in a microwave oven, thereby aiming at preventing bread from undergoing the deterioration in qualities caused by hardening etc. under the above conditions. That is, the thickener or pregelatinized starch should be sufficiently dispersed during production of the bread dough in order to exhibit the above-mentioned action efficiently. However, the thickener or pregelatinized starch, once having absorbed water, is easily aggregated to undergo deterioration in dispersibility, thus not only failing to sufficiently endow bread obtained by baking with an effect of suppressing deterioration in texture upon heating in a microwave oven, but also making excellent texture hardly achievable sometimes due to the aggregated thickener.

Accordingly, the present invention provides bread which, even after having heating one stored at room temperature, a chilled one or a frozen one with a microwave oven, is suppressed from rapid hardening (hard to chew and hard to cut) and has a texture excellent in a dissolving feel in the mouth. Particularly, the present invention provides bread excellent in texture even when heated in a microwave oven with high power (1000 W or more) for business use.

The cereal flour used in the present invention contains primarily wheat flour containing a crude protein whose amount should be 9% by weight (hereinafter referred to simply as %) or more and less than 11.5%. Usually, bread is prepared from only strong wheat flour, and the amount of crude protein in strong wheat flour is generally in the range of 11.5 to 13.0% (Science II of Bread Manufacture, Science of Bread Material [in Japanese], Korin (1992), edited by Yasuo Tanaka and Hiroshi Matsumoto), but when the amount of crude protein in cereal flour is 9% or more to less than 11.5%, the aggregation of protein in wheat flour caused by thermal denaturation, which is one cause for bread hardening upon heating in a microwave oven, is prevented so that bread excellent in texture can be obtained even upon heating in a microwave oven. As used herein, the "bread hardening" refers to the phenomenon in which bread becomes "hard to chew and hard to cut" upon eating.

The method of regulating the amount of crude protein in cereal flour in the present invention can be carried out by using strong wheat flour in combination with one or more members selected from semi-strong wheat flour, moderately strong wheat flour, weak wheat flour, starch or modified starch, all of which have less crude protein than in strong wheat flour. Alternatively, the above cereal flours other than strong wheat flour can be used alone or as a mixture of two or more thereof. In this case, the amount of crude protein in cereal flour should be 9% or more to less than 11.5%, and thus when crude protein is lower than this range, the amount of crude protein should be regulated by using vital gluten etc.

Furthermore, the protein in wheat flour varies not only in amount but also in quality, depending on the type of wheat. That is, the comparison in physical properties (rheologic properties) among the above wheat flours when kneaded with water reveals that strong wheat flour and semi-strong wheat flour have high elasticity, while weak wheat flour has low elasticity, and also that with respect to strength after thermal denaturation, weak wheat flour also has lower elasticity. It follows that from the viewpoint of suppressing bread hardening after heating in a microwave oven, the amount of crude protein in cereal flour is regulated preferably by using a combination of weak wheat flour low in elasticity in physical properties, starch hardly containing protein, modified starch, and strong wheat flour.

When the amount of crude protein is too low, the viscoelasticity of dough is reduced in producing bread, thus causing problems such as sticky dough, a smaller volume of bread, etc., so it is necessary from the viewpoint of breadmaking workability that crude protein is contained in a larger amount than a certain level. It is necessary that the amount of crude protein in cereal flour is 9% or more. As described above, it is necessary from the viewpoint of suppressing bread hardening after microwave heating and of breadmaking workability that the amount of crude protein in the cereal flour containing primarily wheat flour used in the present invention is 9% or more and less than 11.5% and is preferably 9.5 to 1.1%, more preferably 9.8 to 10.7%.

When the cereal flour containing primarily wheat flour used in the present invention is a combination of strong wheat flour and weak wheat flour, the strong wheat flour/weak wheat flour ratio in the cereal flour is preferably from 90/10 to 50/50, more preferably 80/20 to 60/40, from the viewpoint of suppressing bread hardening after microwave heating and of breadmaking workability. In the case of a combination of strong wheat flour and starch or modified starch, the strong wheat flour/starch or modified starch ratio in the cereal flour is preferably from 95/5 to 76/24, more preferably from 85/15 to 80/20, from the viewpoint of suppressing bread hardening after microwave heating and of breadmaking workability.

Specific examples of the modified starch include acetylated starch, hydroxypropylated starch, starch octenylsuccinate, acetylated crosslinked starch adipate, acetylated crosslinked starch phosphate, starch acetate, oxidized starch, crosslinked starch monophosphate, starch phosphate, crosslinked starch phosphate, hydroxypropylated crosslinked starch phosphate etc. Crosslinking treatment with a usual crosslinking agent such as trimetaphosphate, hexametaphosphate, phosphorus oxychloride, adipic acid, epichlorohydrin etc., particularly phosphate crosslinking treatment, is preferable from the viewpoint of bread hardening-suppression after microwave heating and decreased texture. The degree of phosphate treatment, in terms of the content of bound phosphorus, is in the range of 0.0001 to 2%, preferably 0.0001 to 0.5%, more preferably 0.0001 to 0.2%, from the viewpoint of improving flavor and texture (dissolving feel in the mouth).

The modified starch may be converted into another modified starch by combination with other processing treatments. The processing treatments which can be combined include esterification treatment with acetic acid, phosphoric acid etc., etherification treatment by hydroxypropylation, carboxymethyl etherification etc., acetylation treatment, oxidation treatment, acid treatment, bleaching treatment, heated moisture treatment, heat treatment, enzyme treatment etc., among which one or more kinds of treatments may be used in combination.

The fat and oil (A) used in the present invention may be those of animal or vegetable origin having plasticity, such as butter, lard, margarine, shortening, etc., or liquid oil, or various hydrogenated hardened oils thereof (solid fats) and transesterified oils thereof. The amount of the fat and oil (A) compounded is 1 to 67 parts by weight, preferably 3 to 60 parts by weight, more preferably 5 to 55 parts by weight, based on 100 parts by weight (hereinafter referred to simply as "parts") of cereal flour.

The fat and oil (A) used in the present invention is preferably a combination of (A1) fat and oil having a melting point of 25 to 50° C. and (A2) liquid oil having a melting point 20° C. or less.

From the viewpoint of bread production, the fat and oil having a melting point of 25 to 50° C. (A1) have the functions of improving an internal phase texture of bread, increasing the volume thereof and improving mechanical resistance, and fat and oil having plasticity, such as butter, lard, margarine, shortening, etc. are generally used. J. C. Baker et al. have recognized that it is a condition necessary for effective functioning that added fats and oils are in a solid state in a step of molding and fermenting bread dough. Similar to bread dough not using fats and oils, bread dough kneaded with liquid oil or with fats and oils melted at the fermentation temperature terminates expansion at an early stage in an oven, to provide bread with a small volume. A reason mentioned for this phenomenon is that the dough with liquid oil cannot retain expansion caused by water vapor, air, etc. generated at low temperatures at which gelatinization of starch and thermal solidification of gluten do not occur, and thus such water vapor, air, etc. are diffused to the outside of the dough (Science II of Bread Manufacture, Science of Bread Material [in Japanese], Korin (1992), edited by Yasuo Tanaka and Hiroshi Matsumoto/J. C. Baker, M. D. Mize, Cereal Chem., 19, 84 (1942)).

With respect to properties, the fat and oil should have a melting point of 25 to 50° C., preferably 27 to 45° C., more preferably 30 to 40° C., and are in a semisolid or solid state at room temperature. SFC (25° C.) in the fat and oil (A) is preferably 5 to 40%, more preferably 10 to 35%, even more preferably 15 to 30%.

As the fat and oil, fat and oil of animal or vegetable origin, or their hydrogenated hardened oils (solid fats), and transesterified oils are used. Specific examples of fat and oil (A1) usable in the present invention include animal oils such as tallow, lard and fish oil, and vegetable oils such as soybean oil, palm oil, palm kernel oil, cottonseed oil, peanut oil, rape oil, corn oil, safflower oil, sunflower oil, rice oil, etc. From the viewpoint of breadmaking workability and flavor, the amount of the fat and oil (A1) incorporated into 100 parts of cereal flour is preferably 0.5 to 50 parts, more preferably 2.5 to 43 parts, even more preferably 4.5 to 38 parts.

The liquid oil (A2) having a melting point of 20° C. or less is edible fat and oil having a melting point of 20° C. or less, such as rape oil, corn oil, soybean oil, palm oil, rice oil, fish oil, etc. Particularly, the liquid oil (A2) is preferably liquid oil having a melting point of 10° C. or less, among which rape oil, corn oil, soybean oil and rice oil are preferable. Further, diacyl glycerol and middle-chain fatty acid-containing triglyceride and diglyceride can be preferably used as the liquid oil insofar as they satisfy the parameter of melting point as described above. The optimum compounding amount of the liquid oil (A2) having a melting point of 20° C. or less is preferably 0.5 to 17 parts, more preferably 1 to 10 parts, based on 100 parts of cereal flour, from the viewpoint of bread hardening suppression after microwave heating and of breadmaking workability.

The humectant (B) in the present invention includes protein, thickening polysaccharides, etc. From the viewpoint of attaining both excellent texture and a sufficient effect of suppressing bread hardening after microwave heating, the amount of the humectant added is 0.001 to 2 parts, preferably 0.01 to 1.5 parts, more preferably 0.05 to 1 part, based on 100 parts of cereal flour.

The protein may be a substance showing viscosity when dissolved in water, and includes milk protein and plant protein. The milk protein includes sodium casein, calcium casein, rennet casein, milk casein, milk whey, lactalbumin, lactoglobulin, etc.

Also, the thickening polysaccharides include gellan gum, karaya gum, tamarind seed gum, cod gum, glucomannan, xanthane gum, locust bean gum, pullulan, guar gum, iotacarrageenan, HM pectin, LM pectin, tragacanth gum, crystalline cellulose, PGA (propylene glycol alginate), SSHC (water-soluble soybean polysaccharide), gum ghatti, methyl cellulose, psyllium seed and cassia gum, etc. These proteins and thickening polysaccharides may be used alone or as a mixture of two or more thereof. In respect of flavor and texture, xanthane gum, guar gum and locust bean gum are preferable, and xanthane gum is more preferable.

The emulsifier (C) used in the present invention includes glycerin fatty esters, sucrose fatty esters, sorbitan fatty esters, propylene glycol fatty esters, lecithin and lecithin derivatives, and these materials are used preferably as a mixture of two or more thereof. The amount of the emulsifier (C) added is 0.1 to 7 parts, preferably 0.1 to 5 parts, relative to 100 parts of cereal flour, for the reason (1) that bread hardening is suppressed by the emulsifier itself, and for the reason (2) that when the liquid oil (A2) is used, the humectant (B) in a powdery state can be fixed and dispersed in the liquid oil (A2), resulting in improvement of the texture (dissolving feel in the mouth) of the bread.

Furthermore, as the emulsifier (C), glycerin fatty esters and propylene glycol fatty esters are preferably used from the above-mentioned (1). The glycerin fatty esters in the present invention are esters between glycerin and fatty acid or derivatives thereof and refer to glycerin fatty monoester (usually called monoglyceride), glycerin fatty diester, glycerin organic fatty monoester, polyglycerin fatty monoester, polyglycerin condensed linoleic ester, etc. The propylene glycol fatty esters in the present invention are esters between propylene glycol and fatty acid and are used in the form of monoester or diester. In particular, the glycerin fatty monoester and propylene glycol fatty monoester are preferable from the above-mentioned (1), and these are more preferably simultaneously used. That is, the total of the glycerin fatty monoester and propylene glycol fatty monoester in the emulsifier is 80% by weight or more, and the glycerin fatty ester/propylene glycol fatty monoester ratio by weight=1/0.5 to 2.0, preferably a ratio of almost 1/1. The liquid oil (A2) having a melting point 20° C. or less/emulsifier (C) ratio by weight is 6.5 or less (value obtained by dividing the amount of the incorporated liquid oil by the amount of the incorporated emulsifier), preferably 1.7 to 6.5, more preferably 2.0 to 6.5, even more preferably 3.0 to 6.5, from the above-mentioned (2). That is, the liquid oil (A2) can be hardened to such a degree as to lose mobility, and the humectant (B) in a powdery state dispersed in the same liquid oil can be uniformly fixed and dispersed without precipitation.

In the present invention, the degree of penetration can be defined as a measure indicative of the hardened state of the liquid oil losing mobility. According to the measurement of the degree of penetration described in ASTM-D217 ("ASTM Penetration Measurement Method", D217 in the Annual Book of Standards 1994. Section 5, Volume 05.01), the degree of penetration is a value measured in the following manner. That is, the fat and oil composition is packed in a container of length 115 mm×width 115 mm×depth 90 mm, and its surface is flattened. The sample is left at measurement temperature (20° C.) for 30 minutes, and then a needle (penetrometer cone) equipped with an 102.5 g conical loading is contacted with the surface of the sample, and after 5 seconds, the distance by which the needle penetrated is indicated in the unit of 0.1 mm. Generally, a smaller degree of penetration is indicative of higher hardness of a sample measured. In the present invention, the degree of penetration is 200 or less, more preferably 100 or less, in order that the fat and oil composition is in a hardened state without mobility.

The glycerin fatty monoester is particularly preferably used from the above-mentioned (1). For more effectively exhibiting the effect of suppressing bread hardening after microwave heating, the glycerin fatty monoester is compounded in an amount of preferably 5 to 20 parts, more preferably 7 to 15 parts. When the glycerin fatty monoester is in this range, the effect of suppressing bread hardening after microwave heating is higher than when another emulsifier is used. From the viewpoint of the above-mentioned (2), the propylene glycol fatty monoester is compounded in an amount of preferably 5 to 20 parts, more preferably 7 to 15 parts.

The fatty acid as a constituent of the glycerin fatty ester and propylene glycol fatty ester in the present invention includes C12 to C22 saturated or unsaturated fatty acids such as lauric acid, myristic acid, palmitic acid, stearic acid, oleic acid, behenic acid etc., among which the saturated fatty acids are particularly preferable, and C14 to C22 saturated fatty acids are more preferable. The ester may be constituted from one of these fatty acids, but may be a mixture constituted from two or more fatty acids.

As another usable emulsifier, the glycerin organic fatty monoester mentioned in one form of the glycerin fatty ester is a compound wherein an OH group in position 3 of the glycerin fatty monoester has been esterified with an organic acid. The organic acid includes aliphatic monocarboxylic acids constituted of lower fatty acids such as acetic acid, propionic acid, butyric acid, etc., aliphatic saturated dicarboxylic acids such as oxalic acid, succinic acid, etc., aliphatic unsaturated dicarboxylic acids such as maleic acid, fumaric acid, etc., oxy acids such as lactic acid, malic acid, tartaric acid, diacetyltartaric acid, citric acid, etc., and amino acids such as glycine, aspartic acid, etc. Particularly, citric acid, succinic acid, tartaric acid, and diacetyltartaric acid are preferable, and those having an HLB of 4 to 14 are preferable.

Commercial glycerin organic fatty esters partially contain unreacted organic acids or glycerin fatty monoesters, and such commercial glycerin organic fatty monoesters can also be used in the present invention.

Further, specific examples of the polyglycerin constituting the polyglycerin fatty monoester include one or more compounds selected from the group consisting of tetraglycerin, pentaglycerin, hexaglycerin, heptaglycerin, nonaglycerin and decaglycerin. Particularly, those having a glycerin polymerization degree of 1 to 9 are preferable.

The polyglycerin condensed ricinoleic ester is an ester between polyglycerin and condensed ricinoleic acid, and usually a mixture of mono- or diesters between polyglycerin having a glycerin polymerization degree of 2 to 3 and condensed ricinoleic acid having 3 to 5 ricinoleic acid molecules condensed therein is used.

The sucrose fatty ester used in the present invention is an ester between sucrose and fatty acid, and includes mono-, di-, tri- and poly-esters, and its constituent fatty acid is one of C12 to C24 fatty acids or a mixture of two or more of such fatty acids. Those having an HLB of 5 to 15 are preferable.

The sorbitan fatty ester used in the present invention is an ester between sorbitan and fatty acid, and its constituent fatty acid is one of C12 to C24 fatty acids or a mixture of two or more of such fatty acids. The sorbitan fatty ester includes monoesters and triesters, among which the monoesters are preferable in the present invention.

Lecithin used in the present invention is a phospholipid mixture containing phosphatidyl choline, phosphatidyl ethanolamine, phosphatidyl inositol, phosphatidic acid, etc., and its typical example is lecithin obtained from soybean or yolk or the like. The lecithin derivatives include lysolecithin, lysophosphatidic acid, etc.

In the present invention, every sugar typically used in bread can be used. Specifically, it is possible to use monosaccharides such as glucose, fructose, galactose etc., polysaccharides such as maltose, sucrose, maltose, starch syrup, isomerized sugar, invert sugar, cyclodextrin, branched cyclodextrin, dextrin etc., reducing sugar such as starch hydrolysates, sugar alcohols such as sorbitol, maltitol, xylitol, etc., sucralose, aspartame, acesulfame potassium, etc., and these can be used singly or as a mixture of two or more thereof. From the viewpoint of breadmaking workability and bread flavor, the amount of sugars incorporated into bread dough is preferably 3 to 50 parts, more preferably 5 to 45 parts, even more preferably 10 to 35 parts, based on 100 parts of cereal flour.

In the present invention, it is preferable that (A2) liquid oil having a melting point of 20° C. or less, (B) a humectant and (C) an emulsifier are mixed beforehand to prepare (E) a fat and oil composition which is then incorporated into cereal flour. From the viewpoint of the above-mentioned (1) and (2), the fat and oil composition (E) is prepared so as to contain 50 to 85 parts of (A2) liquid oil having a melting point 20° C. or less, 0.1 to 10 parts of (B) a humectant and 10 to 35 parts of (C) an emulsifier wherein the (A2)/(C) ratio by weight is 6.5 or less.

From the viewpoint of the above-mentioned (2), the amount of the emulsifier (C) incorporated into the fat and oil composition is 14 to 26 parts, while the (A2)/(C) ratio by weight is 6.5 or less. When the emulsifier (C) in the fat and oil composition (E) is incorporated into bread, a necessary amount of the additional emulsifier (C) can be incorporated separately from the fat and oil composition (E) into bread.

In the fat and oil composition (E) in the present invention, a preservative, a pH adjusting agent, a colorant, a spice, etc. may be suitably used as other ingredients.

Specifically, the process for producing the fat and oil composition (E) includes first heating the ingredients (A2) and (C) at a temperature not lower than the melting points of the respective ingredients, to melt them uniformly, then adding the ingredient (B), and stirring the mixture uniformly. The resulting uniform mixture is cooled to a temperature not higher than the melting points of the respective ingredients, preferably to 30° C. or less, whereby the objective fat and oil composition is obtained. The rate of cooling is preferably higher. That is, when the emulsifier is crystallized by cooling, rapid cooling is more preferable than gradual cooling because coarse crystals of the emulsifier are not formed, thus improving the dispersibility of the emulsifier itself and promoting the effect of suppressing bread hardening after microwave heating. In the production described above, a container itself containing the uniform mixture at high temperature may be externally cooled in order to cool the uniform mixture, but in respect of performance, it is generally preferable that the mixture is cooled rapidly with a chiller, a votator mixer, a combinator or the like used in the production of shortening or margarine.

In the present invention, it is preferable that the fat and oil composition (E) added in preparation of bread is incorporated in an amount of preferably 1 to 20 parts, more preferably 3 to 10 parts, based on 100 parts of cereal flour used in bread, in order to exhibit the effects in the above-mentioned (1) and (2).

The raw material of the bread in the present invention includes not only cereal flour containing primarily wheat flour as a main raw material, but also yeast food, water, dairy products, common salt, seasonings (sodium glutamate and nucleic acids), a preservative, reinforcing agents such as vitamins, calcium, etc., protein, amino acids, chemical expanding agents, flavors, etc. Further, dried fruits such as raisin, wheat flour bran and whole grain powder, which are generally easily aged when used as the raw material, can be used.

The method of producing the bread includes a straight method (straight dough method), a sponge-dough method, a poolish process, a hot-water poolish process, etc.

The bread of the present invention also includes bread stuffed with fillings, etc., and sliced bread, special bread, cooked bread, sweet rolls, etc. Specifically, sliced bread includes white bread, rye bread, French bread, variety bread, rolls (table roll, buns, butter roll etc.), etc. Special bread includes muffins, etc.; cooked bread includes breads for hot dogs, hamburgers, etc.; and sweet rolls include bread containing jam, a bean-jam bun, cream bread, raisin bread, melon bread, sweet roll, rich goods (croissant, brioche, Danish pastry) etc.

After baking, preferably, the bread of the present invention is stored in a chilled or frozen state before the microwave heating so that the bread can be stored for a longer time than in storage at room temperature. The efficiency of production of bread can be increased and low costs can be achieved.

EXAMPLES

Formulations of the fat and oil compositions (a to f) used in Test Examples 1 to 6 and Test Examples 9 to 13 in the present invention are shown in Table 1. The method of preparing the fat and oil compositions a to e is shown below. In the fat and oil composition d, the fat and oil corresponding to (A1) was used in place of (A2) mentioned below.

[Method of Preparing the Fat and Oil Composition]
1) The ingredients (A2) and (B) were weighed in a stainless steel beaker having a volume of 2 liters.
2) The above-mentioned 1) was uniformly dissolved in a water bath at 85° C. and left for 30 minutes.
In this step, agitation was carried out using an anchor hook and a three-one motor (TYPE60G manufactured by HIDON Co., Ltd.).
3) The previously weighed ingredient (C) was added, while stirring, to the above-mentioned 2), and after it was confirmed that the mixture became uniform, the mixture was left for 30 minutes.
4) In the above-mentioned 3), a large amount of ice was placed in the water bath to cool the mixture to 30° C., and the mixture was kept at a temperature of 30° C. and simultaneously stirred, and then transferred to a predetermined container.
5) The above-mentioned 4) was left overnight (for about 12 hours) in a thermostatic bath at 15° C., and then measured for the degree of penetration and subjected to breadmaking evaluation.

The compounding ratios of (A2) liquid oil having a melting point of 20° C. or less or (A1) fat and oil having a melting point of 25 to 50° C. to the emulsifier (C) in the fat and oil compositions a to f, and measurement results of the degrees of penetration, are shown in Table 1.

TABLE 1

|   |   | Fat and oil composition |   |   |   |   |   |
|---|---|---|---|---|---|---|---|
|   |   | a | b | c | d | e | f *1) |
| (A) | (A2) Refined rape oil (melting point 10° C. or less) | 80.9 | 75.6 | 80.0 | — | 80.6 | 80.9 |
|   | (A1) Commercial vegetable shortening (melting point 37° C.) | — | — | — | 80.9 | — | — |
| (B) | Xanthane gum (BistopD-3000: manufactured by San-Ei Gen F.F.I., Inc.) | 2.5 | — | — | 2.5 | — | 2.5 |
|   | Guar gum (Bistop D-20: | — | 5.4 | — | — | — | — |

TABLE 1-continued

| | | Fat and oil composition | | | | | |
|---|---|---|---|---|---|---|---|
| | | a | b | c | d | e | f*1) |
| | manufactured by San-Ei Gen F.F.I., Inc.) | | | | | | |
| | Locust bean gum(Bistop D-6: manufactured by San-Ei Gen F.F.I., Inc.) | — | — | 1.0 | — | — | — |
| (C) | Glycerin fatty monoester (ExcelT-95: manufactured by Kao Corp.) | 7.8 | 8.0 | 8.0 | 7.8 | 8.2 | 7.8 |
| | Propylene glycol monobehenic acid ester (PGMB: manufactured by Kao Corp.) | 7.8 | 8.0 | 8.0 | 7.8 | 8.2 | 7.8 |
| | Polyglycerine condensed ricinoleic ester (Sun Soft 818SK: manufactured by Taiyo Kagaku Co., Ltd.) | — | 2.0 | 2.0 | — | 2.0 | — |
| | Soybean Lecithin (Nissin Lecithin Dx: Manufactured by Nissin Oillio Group, Ltd.) | 1.0 | 1.0 | 1.0 | 1.0 | 1.0 | 1.0 |
| | (A2)/(C) ratio by weight | 4.9 | 4.0 | 4.2 | — | 4.2 | 4.2 |
| | (A1)/(C) ratio by weight | — | — | — | 4.9 | — | — |
| | Degree of penetration | 43 | 40 | 61 | 13 | 40 | — |

*1) Fat and oil composition f: The respective ingredients were added without preparing the fat and oil composition.

Bread dough in Test Examples 1 to 13, compounded with the fat and oil compositions a to f, were prepared, baked and then subjected to breadmaking evaluation. Bread compositions subjected to the evaluation are shown in Table 2.

TABLE 2

| | | Test example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Used fat and oil composition | | a | b | c | a | a | a | — | — | d | e | f | a | a |
| Protein amount (%) in cereal flour | | 10.4 | 10.4 | 10.4 | 10.9 | 9.9 | 10.0 | 11.8 | 10.4 | 10.4 | 10.4 | 10.4 | 10.7 | 11.8 |
| Dough composition at Intermediate stage(parts by weight) | Strong wheat flour*2) | 70 | 70 | 70 | 70 | 60 | 70 | 70 | 70 | 70 | 70 | 70 | 35 | 70 |
| | Weak wheat flour*3) | — | — | — | — | 10 | — | — | — | — | — | — | — | — |
| | Moderately strong wheat flour*4) | — | — | — | — | — | — | — | — | — | — | — | 35 | — |
| | Yeast | 3 | 3 | 3 | 3 | 3 | 3 | 3 | 3 | 3 | 3 | 3 | 3 | 3 |
| | Yeast Food | 0.1 | 0.1 | 0.1 | 0.1 | 0.1 | 0.1 | 0.1 | 0.1 | 0.1 | 0.1 | 0.1 | 0.1 | 0.1 |
| | Commercial powdery emulsifier*5) | 0.3 | 0.3 | 0.3 | 0.3 | 0.3 | 0.3 | 0.3 | 0.3 | 0.3 | 0.3 | 0.3 | 0.3 | 0.3 |
| | Sugar | 4 | 4 | 4 | 4 | 4 | 4 | 4 | 4 | 4 | 4 | 4 | 4 | 4 |
| | Whole egg | 6 | 6 | 6 | 6 | 6 | 6 | 6 | 6 | 6 | 6 | 6 | 6 | 6 |
| | Water | 36 | 36 | 36 | 36 | 36 | 36 | 36 | 36 | 36 | 36 | 36 | 36 | 36 |
| Dough composition in Kneading stage(parts by weight) | Strong wheat flour*2) | — | — | — | 10 | — | 15 | 30 | — | — | — | — | 15 | 30 |
| | Weak wheat flour*3) | 30 | 30 | 30 | 20 | 30 | — | — | 30 | 30 | 30 | 30 | — | — |
| | Moderately strong wheat flour*4) | — | — | — | — | — | — | — | — | — | — | — | 15 | — |
| | Modified starch*6) | — | — | — | — | — | 15 | — | — | — | — | — | — | — |
| | Sugar | 10 | 10 | 10 | 10 | 10 | 10 | 10 | 10 | 10 | 10 | 10 | 10 | 10 |
| | Common salt | 2 | 2 | 2 | 2 | 2 | 2 | 2 | 2 | 2 | 2 | 2 | 2 | 2 |
| | Powdered skim milk | 5 | 5 | 5 | 5 | 5 | 5 | 5 | 5 | 5 | 5 | 5 | 5 | 5 |
| | Margarine | 6 | 6 | 6 | 6 | 6 | 6 | 6 | 6 | 6 | 6 | 6 | 6 | 6 |

TABLE 2-continued

|  | Test example |  |  |  |  |  |  |  |  |  |  |  |  |
|---|---|---|---|---|---|---|---|---|---|---|---|---|---|
|  | 1 | 2 | 3 | 4 | 5 | 6 | 7 | 8 | 9 | 10 | 11 | 12 | 13 |
| Fat and oil composition | 5 | 5 | 5 | 5 | 5 | 5 | — | — | 5 | 5 | 5 | 5 | 5 |
| Water | 18 | 18 | 18 | 18 | 18 | 18 | 18 | 18 | 18 | 18 | 18 | 18 | 18 |

[2]Strong wheat flour: Camellia (crude protein 11.8%) manufactured by Nisshin Flour Milling Co., Ltd.
[3]Weak wheat flour: Violet (crude protein 7.1%) manufactured by Nisshin Flour Milling Co., Ltd.
[4]Moderately strong wheat flour: Asahi (crude protein 8.0%) manufactured by Nisshin Flour Milling Co., Ltd.
[5]Emulgy MM-100 manufactured by Riken Vitamin Co., Ltd.
[6]Modified starch: Pine Bake CC manufactured by Matsutani Chemical Industry <Conditions for Producing Bread>
(Breadmaking)
1. Conditions for Preparing Dough in the Intermediate Stage Using a vertical mixer (Kanto mixer, 5 coats) and a hook, the materials in the intermediate stage, shown in Table 2, were introduced into the mixer and kneaded at low speed for 3 minutes and then for 2 minutes at moderate to high speed, and then formed into intermediate dough at a kneading temperature of 25° C. Then, the dough was fermented (intermediate fermentation). The conditions for this fermentation were as follows:
Intermediate fermentation temperature: 28.0° C.
Intermediate fermentation relative humidity: 80%
Intermediate fermentation time: 2.5 hours
Intermediate fermentation finish temperature: 29.0° C.
2. Conditions for Preparing Dough in the Kneading Stage The intermediate dough was introduced into a vertical mixer (Kanto mixer, 10 coats), and the materials in the kneading stage (materials other than margarine, the fat and oil composition, and xanthane gum) were added and kneaded at low speed for 3 minutes and then at moderate to high speed for 3 minutes, and the remainder materials (margarine, the fat and oil composition, and xanthane gum) were added, kneaded at low speed for 3 minutes, at moderate to high speed for 2 minutes and at high speed for 2 minutes, to make kneaded dough. The kneading temperature of the kneaded dough was 26.5° C.

For recovery of the dough from damage upon kneading, a floor time of 20 minutes was taken at 28.0° C., and thereafter the dough was divided into portions each weighing 60 g. For eliminating dough damage upon division, a bench time of 20 minutes was taken at 27.0° C., and the dough was molded in a molder. The dough was placed on a heating plate and then fermented. The fermentation conditions are as follows:
Fermentation temperature: 38° C.
Relative humidity: 80%
Fermentation time: 50 minutes The bread dough prepared under the conditions shown above was baked for 12 minutes in an oven at 190° C. After baking, the bread dough was cooled to room temperature (20° C.) for 45 minutes, then placed in a vinyl bag, sealed, stored under the following conditions and evaluated as a bread sample.

(1) Storage at 20° C. for 1 day.
(2) Storage at 5° C. for 1 day.
(3) Storage at −20° C. for 12 days.

<Evaluation after Heating in Microwave Oven>
1) Method of Testing Penetration into Bread After Microwave Heating Among the bread samples under the three conditions (1) to (3) above, the bread samples under (1) and (2) were heated for 20 seconds and the bread sample under (3) was heated for 25 seconds, in a microwave oven RE-6200 (output power 1600 W) manufactured by Sharp Corporation. After heating, the bread was left at room temperature for 5 minutes and then cut at 2 cm in the height (thickness) direction below the upper surface of the bread, to give a measurement sample. The measurement sample of 2 cm in thickness cut from the upper surface was measured for its penetration with Texture Analyzer EZ Test manufactured by Shimadzu Corporation. Specifically, a round bread-fixing support was arranged on a sample support, and the measurement sample with the bread upper side (upper surface) up was arranged thereon. A needle-like bar of 5 mm in diameter was allowed to penetrate into the upper surface of the measurement sample at a rate of 300 mm/min., and the maximum load for penetration was determined as penetration.

2) Sensory Evaluation of Bread after Microwave Heating

Among the bread samples under the three conditions (1) to (3) above, the bread samples under (1) and (2) were heated for 20 seconds and the bread sample under (3) was heated for 25 seconds, in a microwave oven RE-6200 (output power 1600 W) manufactured by Sharp Corporation. The bread was left for 5 minutes after heating and then subjected to monadic evaluation by 10 examiners for the absence of firmness (ease of cutting) and dissolving feel in the mouth upon eating. The absence of firmness (ease of cutting) is indicative of an effect of suppressing bread hardening after microwave heating. The results are shown in Table 3.

⊙: Judged to be excellent by at least 8 of 10 examiners.
○: Judged to be excellent by 5 to 7 of 10 examiners.
Δ: Judged to be excellent by 3 to 4 of 10 examiners.
x: Judged to be not excellent by at least 8 of 10 examiners.

TABLE 3

|  | Test example |  |  |  |  |  |  |  |  |  |  |  |  |
|---|---|---|---|---|---|---|---|---|---|---|---|---|---|
|  | 1 | 2 | 3 | 4 | 5 | 6 | 7 | 8 | 9 | 10 | 11 | 12 | 13 |

① Bread sample stored at 20° C. for 1 day, then heated for 20 seconds in a microwave oven and left for 5 minutes

| | | | | | | | | | | | | | |
|---|---|---|---|---|---|---|---|---|---|---|---|---|---|
| Bread penetration (N) | 1.2 | 1.2 | 1.3 | 1.4 | 1.1 | 1.3 | 4.1 | 3.1 | 1.5 | 1.5 | 2.0 | 1.3 | 1.8 |

TABLE 3-continued

| | Test example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Sensory evaluation | | | | | | | | | | | | | |
| Absence of firmness (Ease of cutting) | ◎ | ◎ | ◎ | ◎ | ◎ | ◎ | X | △ | ○ | ○ | △ | ○ | ○ |
| Dissolving feel in the mouth | ◎ | ◎ | ◎ | ◎ | ◎ | ◎ | X | X | △ | X | △ | ○ | △ |

② Bread sample stored at 5° C. for 1 day, then heated for 20 seconds in a microwave oven and left for 5 minutes

| | 1 | 2 | 3 | 4 | 5 | 6 | 7 | 8 | 9 | 10 | 11 | 12 | 13 |
|---|---|---|---|---|---|---|---|---|---|---|---|---|---|
| Bread penetration (N) | 1.1 | 1.3 | 1.3 | 1.4 | 1.1 | 1.3 | 3.5 | 2.7 | 1.3 | 1.5 | 2.0 | 1.3 | 1.6 |
| Sensory evaluation | | | | | | | | | | | | | |
| Absence of firmness (Ease of cutting) | ◎ | ◎ | ◎ | ◎ | ◎ | ◎ | X | △ | ○ | ○ | △ | ○ | ○ |
| Dissolving feel in the mouth | ◎ | ◎ | ◎ | ◎ | ◎ | ◎ | X | X | △ | X | △ | ○ | △ |

③ Bread sample stored at −20° C. for 12 days, then heated for 25 seconds in a microwave oven and left for 5 minutes

| | 1 | 2 | 3 | 4 | 5 | 6 | 7 | 8 | 9 | 10 | 11 | 12 | 13 |
|---|---|---|---|---|---|---|---|---|---|---|---|---|---|
| Bread penetration (N) | 1.1 | 1.1 | 1.1 | 1.2 | 1.1 | 0.9 | 2.7 | 1.9 | 1.3 | 1.4 | 1.7 | 1.3 | 1.5 |
| Sensory evaluation | | | | | | | | | | | | | |
| Absence of firmness (Ease of cutting) | ◎ | ◎ | ◎ | ◎ | ◎ | ◎ | X | △ | ○ | ○ | △ | ○ | ○ |
| Dissolving feel in the mouth | ◎ | ◎ | ◎ | ◎ | ◎ | ◎ | X | X | △ | X | △ | ○ | △ |

① Bread sample stored at 20° C. for 1 day, then heated for 20 seconds in a microwave oven and left for 5 minutes
Bread penetration (N)
[Sensory evaluation]
Absence of firmness (ease of cutting)
Dissolving feel in the mouth
② Bread sample stored at 5° C. for 1 day, then heated for 20 seconds in a microwave oven and left for 5 minutes
③ Bread sample stored at −20° C. for 12 days, then heated for 25 seconds in a microwave oven and left for 5 minutes As shown above, it was found that even after microwave heating, the breads of the present invention suppress bread hardening, are easily cut with less firmness and are excellent in dissolving feel in the mouth.

The invention claimed is:

1. A bread suited for heating in a microwave oven, comprising:
   1 to 67 parts by weight of (A) fat and oil,
   0.001 to 2 parts by weight of (B) a humectant,
   0.1 to 7 parts by weight of (C) an emulsifier, and
   100 parts by weight of cereal flour,
   wherein the cereal flour (i) comprises strong wheat flour and modified starch, and (ii) has a content of a crude protein of 9% by weight or more and less than 11.5% by weight,
   wherein the modified starch is crosslinked starch phosphate.

2. The bread suited for heating in a microwave oven according to claim 1, wherein the fat and oil (A) comprises:
   0.5 to 50 parts by weight of (A1) fat and oil having a melting point of 25 to 50° C. and
   0.5 to 17 parts by weight of (A2) liquid oil having a melting point 20° C. or less.

3. A method of making the bread suited for heating in a microwave oven according to claim 2, the method comprising:
   blending 100 parts by weight of wheat flour with
      0.5 to 50 parts by weight of (A1) fat and oil having a melting point of 25 to 50° C., and
      1 to 20 parts by weight of the fat and oil composition (E),
   wherein the (E) fat and oil composition comprises:
      50 to 85 parts by weight of (A2) liquid oil having a melting point 20° C. or less,
      0.1 to 10 parts by weight of (B) a humectant, and
      10 to 35 parts by weight of (C) an emulsifier)
   wherein the (A2)/(C) ratio is 6.5 or less.

4. The bread suited for heating in a microwave oven according to claim 1 or 2, wherein the bread is stored in a chilled or frozen state before heating in a microwave oven.

5. The bread suited for heating in a microwave oven according to claim 1, wherein a ratio of the strong wheat flour to the modified starch is from 95/5 to 76/24 by weight.

6. The method according to claim 3, wherein a ratio of the strong wheat flour to the modified starch is from 95/5 to 76/24 by weight.

7. The bread suited for heating in a microwave oven according to claim 1, wherein a ratio of the strong wheat flour to the modified starch is from 85/15 to 80/20 by weight.

8. The method of making the bread suited for heating in a microwave oven according to claim 3, wherein a ratio of the strong wheat flour to the modified starch is from 85/15 to 80/20 by weight.

* * * * *